Nov. 29, 1949     H. HARPER     2,489,376

WHEEL ADAPTER

Filed Oct. 1, 1945     2 Sheets-Sheet 1

HENRY HARPER
INVENTOR.

BY Lester B. Clark
& Ray L Smith
ATTORNEYS

Nov. 29, 1949　　　H. HARPER　　　2,489,376

WHEEL ADAPTER

Filed Oct. 1, 1945　　　2 Sheets-Sheet 2

HENRY HARPER
*INVENTOR.*

BY Lester B. Clark
+ Ray L Smith
ATTORNEYS

Patented Nov. 29, 1949

2,489,376

UNITED STATES PATENT OFFICE 2,489,376

WHEEL ADAPTER

Henry Harper, Fairbanks, Tex.

Application October 1, 1945, Serial No. 619,498

10 Claims. (Cl. 287—53)

The invention relates to a wheel adapter assembly whereby a wheel for a belt pulley or chain drive can be positioned within the minimum axial space and supported in such a manner that it can be adjusted slightly by reassembling the various parts so as to place the wheel in radial alignment with such other construction as it is adapted to drive or be driven by.

There are various situations in which it is desirable to position a wheel for operation in a relatively short axial space such as for instance the chain belt wheel on the front of an automobile internal combustion engine. The space between the engine and the radiator or other parts of the frame is relatively small and with the present practices, it is usually necessary to remove the radiator from the automobile in order to remove the pulley wheel and such pulley wheels are not usually adjustable axially of the engine shaft.

It is therefore one of the objects of the present invention to provide a wheel adapter assembly made up of several parts which can be assembled or interfitted in various combinations, each of which will position the wheel on the shaft at a slightly different axial position.

Another object of the invention is to provide a combination of a hub wheel and adapter plates which can be assembled in at least four different combinations so as to obtain at least four different longitudinal positions of the wheel relative to the shaft on which it is being assembled.

Still another object of the invention is to provide a wheel adapter assembly which can be utilized to clamp the wheel in this axial position and operative as a wheel pulley to remove the wheel within a short axial space.

Other and further objects of the invention will be readily apparent when the following description is considered in connection with the accompanying drawings, wherein—

Figure 8:
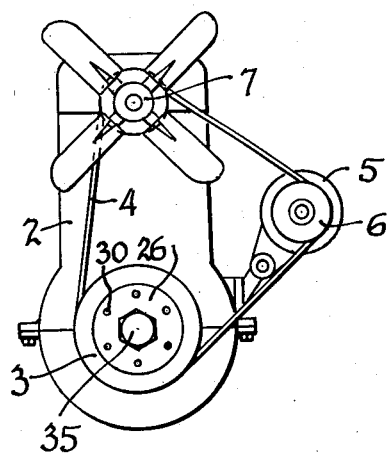
Fig. 8 is a diagrammatic arrangement showing the wheel adapter assembly applied to the crank shaft engine.

In Fig. 8 an internal combustion engine 2 has been illustrated which has the usual form of crank shaft extending from the forward end. A wheel 3 is usually applied to this shaft and serves as a drive for the belt 4. In some types of assemblies the generator 5 has a wheel 6 thereon over which the belt 4 passes in driving the fan 7.

The wheel 3 is usually positioned at such an elevation that it is between the engine and the radiator of the vehicle and is relatively inaccessible. The present invention contemplates the assembly which can be utilized in supporting the wheel 3 in such a manner that the wheel can be adjusted axially when it is applied to this construction.

While the foregoing particular use is contemplated it is to be understood that the wheel adapter assembly can be used in any location and particularly those where adjustment and a minimum of axial space is desired and where the wheel assembly can be pulled without the use of separate equipment.

Figure 1:
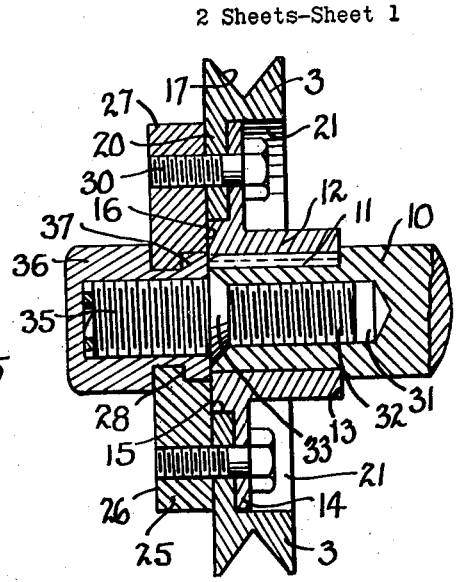
Fig. 1 is a vertical sectional view taken on the line 1—1 of Fig. 2 of the wheel adapter assembly with the various parts clamped in one position.

In Fig. 1 one view of the assembly is illustrated where a shaft 10 has a key-way 11 to receive the hub 12 of the assembly. This hub is of such construction that it is passed axially over the end of the shaft and keyed thereto. The hub 12 has the body portion 13 and the flange 14 extending radially therefrom. Beyond the flange is a shoulder 15 so that the flange 14 is spaced inwardly a short distance from the end 16 of the hub.

The wheel 3 has been illustrated as having a grooved periphery 17 which is arranged to receive a belt. Other types of wheels may be used. The wheel 3 is of a construction wherein the web 20 is positioned at one side thereof so as to leave a recess 21 extending into the center of the wheel.

Figure 2:
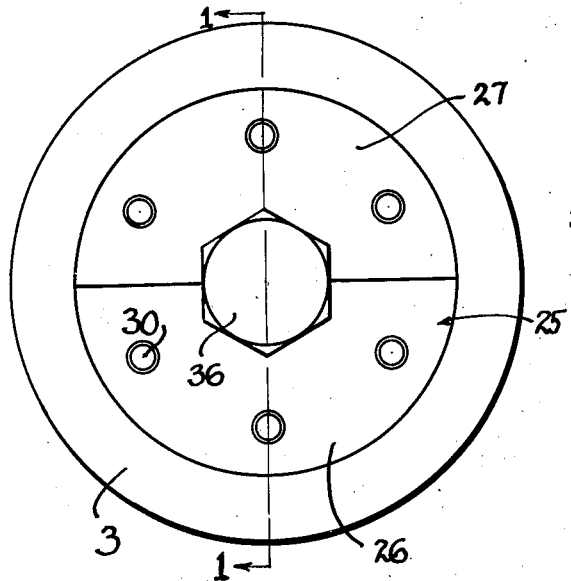
Fig. 2 is an end elevation illustrating the position of the nut and plates.

A plate 25 is shown as abutting the outside of the wheel 3 and this plate is preferably made up of the portions or parts 26 and 27 as seen in Fig. 2. These plates have a shoulder 28 formed by a recess extending about half-way through the plates. These plates are of such diameter when they are combined together that they will fit into the recess 21 inside of the wheel 3.

The clamping bolts 30 are seen in Fig. 2 and are of such length that they are adapted to pass through a flange 14, the web 20 of the wheel, and the plates 25 so as to clamp the three parts together to operate as a unit.

The shafts 10 usually provided are recessed at 31 and threaded so as to receive the threaded spindle 32. This spindle usually has a flared shoulder 33 which fits into a correspondingly beveled portion in the end of the shaft. Beyond the flared shoulder 33 the spindle is enlarged somewhat and threaded at 35 to receive the cap nut 36. This nut is internally threaded to fit on the portion 35 of this spindle and has an outstanding rib 37 at its inner end which is arranged to fit against the shoulder 28 in the same assembly plate portions 26 and 27. This rib 37 is rotatable inside of the plates.

It seems obvious that the parts may be assembled as seen in Fig. 1 and slipped over the end 35 of the spindle. The nut 36 will now be rotated while the wheel hub and plates are held stationary so as to cause the hub to slip along the key 11. As the nut tightens down against the flared shoulder 33 the parts will be securely clamped upon the shaft. In some instances the spindle 32 may be positioned in the cap 36 and rotated with the cap to be threaded into the end of the shaft.

This arrangement of the parts assembles the wheel 3 with its outer face flush with the end of the shaft.

Figure 4:
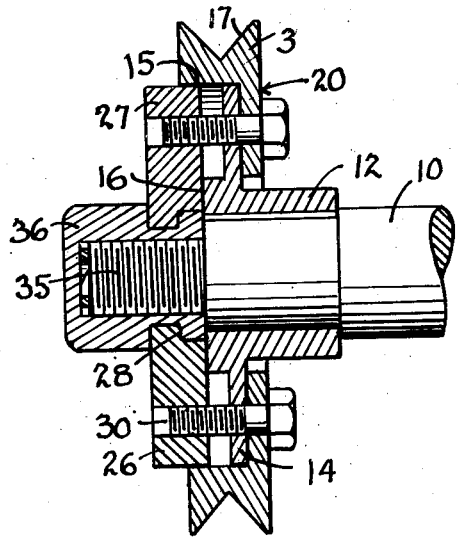
Fig. 4 is a vertical sectional view with the wheel positioned on the inside of the hub flange.

Fig. 4 shows an assembly similar to Fig. 1 except that the wheel 3 has been assembled in reversed position. That is, the web portion 20 of the wheel has been placed on the inside of the flange 14 rather than the outside of such flange as seen in Fig. 1, considering of course that the end of the shaft 10 is the outside end.

Figure 5:
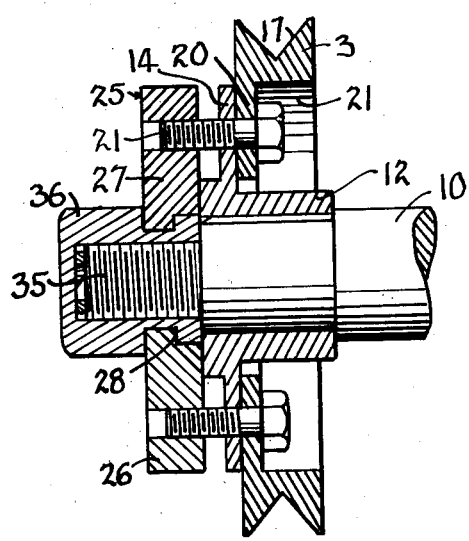
Fig. 5 is a sectional view with the wheel web positioned on the inside of the hub flange but reversed as regards Fig. 4.

Fig. 5 shows a third arrangement of the parts wherein the wheel web is again positioned on the inside of the flange but reversed with regards to the position of Fig. 4 so as to carry the wheel inwardly along the edge of the shaft.

Figure 7:
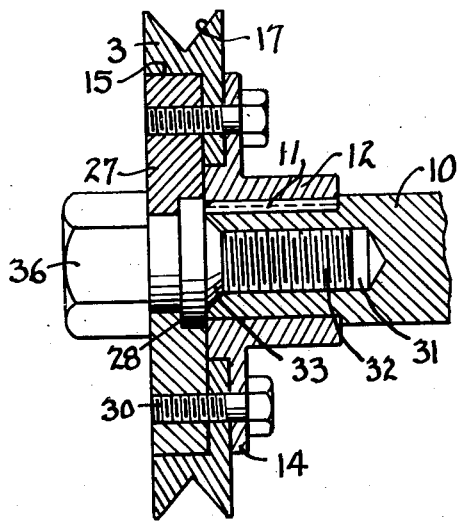
Fig. 7 is a vertical sectional view similar to Fig. 3 except that the removable type of spindle has been employed.

Fig. 7 shows an arrangement wherein the plates 25 have been positioned in the recess 21 in the wheel where the web of the wheel is on the outside of the hub flange and this positions the wheel somewhat outwardly beyond the end of the shaft.

Figure 3:
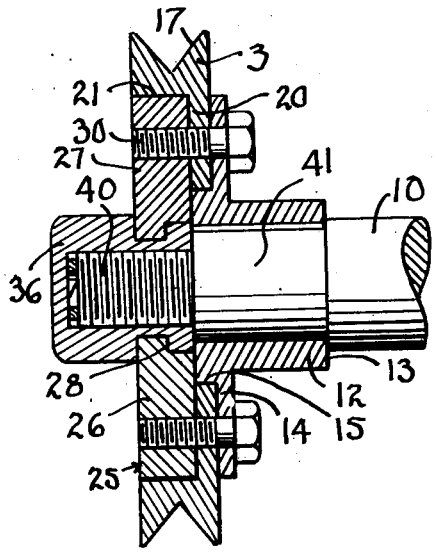
Fig. 3 is a vertical sectional view with the wheel and its supporting web reversed from the position of Fig. 1 and with the threaded spindle being formed integral with the shaft.

Fig. 3 is a view with the parts positioned identically the same as seen in Fig. 7 but the spindle portion 40 is made integral with the reduced end 41 of the shaft 10 and is not in the form of the removable spindle 32 as seen in Figs. 1 and 7.

In Figs. 4 and 5 the shaft and spindle have been shown in elevation because insofar as the modifications of Figs. 4 and 5 are concerned, they could be applied to the arrangement of Fig. 1 with the removable spindle or to that of Fig. 3 with the spindle which is integral with the shaft.

Figure 6:
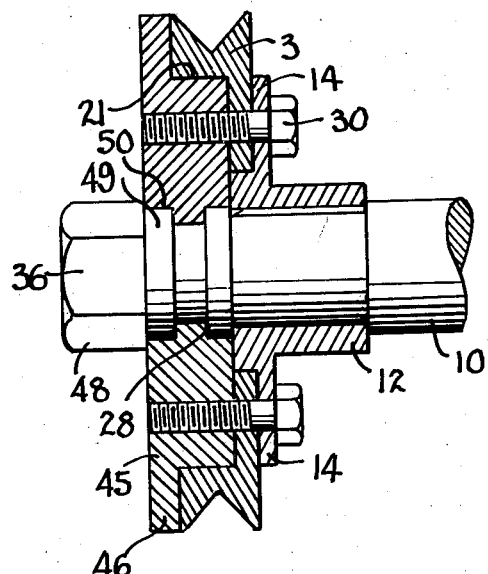
Fig. 6 shows the wheel web on the outside of the hub flange with a modified clamping plate to add weight to the wheel for balance purposes.

Fig. 6 shows a modified arrangement similar to Figs. 3 and 7 except that the plates 25 have been modified somewhat as at 45 to provide an extended periphery 46 which abuts the end face 47 of the wheel 3. This serves to support and reinforce the wheel and also provides additional weight as a rotating balance to prevent too sharp a shock of starting and stopping of the members which are driven by the belt 4. This could be provided of course in the form of separate plates to be applied to the outside of the plates 25 but Fig. 6 shows the integral construction.

To accommodate this additional thickness, the cap nut 36 has been modified as shown at 48 to extend the length thereof so as to provide an additional shoulder 49 fitted into a recess 50 in the outer surface of the plates 45.

It seems obvious that various arrangements and assemblies different from those above described may be accomplished with the four parts, namely, the hub, the wheel, the plates, and the nut. For instance, if the hub 12 were reversed on the shaft to position the flange 14 a substantial distance inwardly from the shaft, an entirely new set of adjustable positions could be obtained.

Broadly the invention contemplates a wheel adapter assembly which can be utilized to apply the wheel at various positions and to serve as a wheel puller.

What is claimed is:

1. A wheel adapter assembly for shafts including a hub keyed to the shaft, a wheel having a recess in one side, a flange on said hub to fit into said recess, a web on said wheel to fit on said hub, a plate overlying said web, clamping means extending through said flange, web, and plate, said plate being split, a threaded spindle in the end of the shaft, and a nut on said spindle to hold said assembly upon said shaft.

2. A wheel adapter assembly for shafts including a hub keyed on the shaft, a wheel having a web at one side thereof, a flange on said hub to fit against said web, a recess in said wheel, a split plate fitted in said recess, a threaded spindle extending from the shaft, a nut threaded on said spindle and fitted between the parts of said plate, and clamping means for said plate, web and flange.

3. A wheel adapter assembly for shafts including a hub keyed on the shaft, a flange on said hub, a wheel having a web at one side and forming a recess in the other side, said wheel being positioned on said hub with said web inwardly of said flange and with the flange in said recess, a split plate abutting said hub and partially disposed in said recess, a threaded spindle on the shaft, a nut threaded thereon and clamped between said plate parts, and clamping means for said plate, web and flange.

4. A wheel adapter assembly for shafts including a hub, a flange thereon, a wheel having a web at one side and thus forming a recess in the other side, said web abutting the inside of said flange with the recess over the hub, a split plate abutting said hub beyond said flange, a threaded spindle on the shaft, a nut threaded on said spindle and clamped by the plate parts, and clamping means extending through the plate, flange and web.

5. A wheel adapter assembly for shafts including a hub keyed on the shaft, a flange thereon, a wheel having a web at one side to provide a recess at the other side, said web abutting the outside of said flange, a split plate filled in said recess and abutting said web and the end of said hub, a threaded spindle in the end of the shaft, a nut on said spindle retained by the split plate, and clamping means for said flange, web, and plate.

6. A wheel adapter assembly for shafts including a hub keyed on the shaft, a flange on said hub, a wheel having a web at one side forming a recess at the other side, said web abutting the outside of said flange, a split plate fitted in said recess from the outside, a flanged threaded spindle in the end of the shaft, said spindle flange being fitted in said plate, a nut on said spindle confining said plate, and clamping means for said plate, web and hub flange.

7. A wheel adapter assembly made up of parts including a hub, a pulley wheel, a split plate, a nut, and means to clamp the wheel, hub and plate together, said hub having a flange thereon, said wheel having a web at one side to provide a recess at the other side, and means on the shaft and plate parts to receive said nut so as to lock said nut to retain said hub flange, wheel web, and split plate parts in at least three different relative assemblies to position said wheel at three different axial positions relative to the shaft.

8. A wheel adapter assembly made up of parts including a hub, a pulley wheel, a split plate, a nut, and means to clamp the wheel, hub and plate together, a flange on said hub, a web at one side of said wheel to provide a recess at the other side, and means on the shaft to receive said nut so as to retain said hub wheel, and plate parts in at least three different assemblies to position said wheel facing either inwardly or outwardly with the web inside said flange, and facing either inwardly or outwardly with the web outside of said flange to arrange the pulley portion at different axial positions relative to the shaft, said means on the shaft being removable therefrom.

9. A wheel adapter assembly made up of parts including a hub, a pulley wheel, a split plate, a nut, and means to clamp the wheel, hub and plate together, said hub having a flange thereon, a web at one side of said wheel to provide a recess at the other side, and means on the shaft to receive said nut so as to retain said wheel web, and said flange parts in different assemblies with said wheel at different axial positions along to the shaft, said nut being clamped in said plate so as to act to pull the assembly from the shaft for removal.

10. A wheel adapter assembly for shaft ends comprising a hub to fit on the shaft and rotate therewith, an outstanding flange on said hub spaced inwardly from the outer end of the hub, a wheel including an annular peripheral portion to receive a belt to be driven by the shaft and wheel, a radially inwardly extending web in said wheel, said web being disposed at one edge of said wheel to create a wheel recess so that the wheel may be positioned with either side of said web against either side of said flange to vary the axial position of the belt receiving portion of said wheel, a split two-part plate of a size to fit in said wheel recess, against either side of said web and against either side of said flange or against the end of said hub, a nut, means to thread said nut to said shaft, an annular recess in said nut to receive the parts of said plate, and additional means to clamp said flange web and plate parts together so as to lock said nut.

HENRY HARPER.

REFERENCES CITED

The following references are of record in the file of this patent:

UNITED STATES PATENTS

| Number | Name | Date |
| --- | --- | --- |
| 365,037 | Allington | June 21, 1887 |
| 835,031 | Myers | Nov. 6, 1906 |
| 912,488 | Richards | Feb. 16, 1909 |
| 1,799,884 | Chantry | Apr. 17, 1931 |
| 1,932,522 | Irgens | Oct. 31, 1933 |
| 1,979,675 | Croom | Nov. 6, 1934 |